United States Patent
Gimbel et al.

(10) Patent No.: US 7,087,256 B2
(45) Date of Patent: *Aug. 8, 2006

(54) FLAVORING COMPOSITION AND PROCESS FOR BREWING MALT BEVERAGES

(75) Inventors: Adam M. Gimbel, Atlantic Highlands, NY (US); Trevor R. Roberts, Ipswich (GB); Robert J. Smith, Yakima, WA (US); Richard J. H. Wilson, Copthorne (GB)

(73) Assignee: S.S. Steiner, Inc., New York, NY (US)

( * ) Notice: Subject to any disclaimer, the term of this patent is extended or adjusted under 35 U.S.C. 154(b) by 233 days.

This patent is subject to a terminal disclaimer.

(21) Appl. No.: 09/896,375

(22) Filed: Jun. 29, 2001

(65) Prior Publication Data

US 2002/0076475 A1 Jun. 20, 2002

Related U.S. Application Data

(60) Provisional application No. 60/215,408, filed on Jun. 30, 2000.

(51) Int. Cl.
*C12C 11/00* (2006.01)

(52) U.S. Cl. ............ 426/16; 426/29; 426/231; 426/386; 426/600

(58) Field of Classification Search ........ 426/600, 426/16, 29, 231, 386; 250/231.1, 221, 206.1; 356/28; 180/167–169; 340/936, 942

See application file for complete search history.

(56) References Cited

U.S. PATENT DOCUMENTS

| 4,104,409 A | 8/1978 | Vitzthum et al. ........... 426/386 |
| 4,282,259 A | 8/1981 | Wheldon et al. ........... 426/231 |
| 4,918,240 A | 4/1990 | Todd, Jr. et al. ............ 568/366 |
| 5,200,227 A | 4/1993 | Guzinski et al. ............ 426/600 |
| 5,917,093 A | 6/1999 | Ting et al. .................. 568/366 |

*Primary Examiner*—Keith Hendricks
*Assistant Examiner*—Sarah L. Kuhns
(74) *Attorney, Agent, or Firm*—Hayes Soloway P.C.

(57) ABSTRACT

An improved flavoring composition and process for brewing malt beverages is disclosed. In one embodiment of the invention, the flavoring composition is formed from a high solids percent, room temperature stable, partially aqueous composition of a potassium salt of iso-α-acids. Such composition may be added to the wort kettle or else used as a post-fermentation additive, preferably after dilution with demineralized water. In another embodiment, the flavoring composition comprises a mixture containing reduced (rho-) iso-α-acids in alkali metal salts form, β-acids and hop oil. This latter composition is useful as a substitute for normal kettle extract, hops or hop pellets, allowing easy preparation of beer that resists formation of unpleasant, "skunk" flavors but has otherwise similar flavor and physical properties.

6 Claims, 2 Drawing Sheets

FLAVORING COMPOSITION AND PROCESS FOR BREWING MALT BEVERAGES

CROSS REFERENCE TO RELATED APPLICATIONS

This application claims benefit of U.S. Provisional Application Ser. No. 60/215,408, filed Jun. 30, 2000.

FIELD OF THE INVENTION

The present invention relates to improved hop-based flavoring compositions for use in manufacturing malt beverages, and to improved processes for brewing malt beverages using such improved flavoring composition.

BACKGROUND OF THE INVENTION

Materials extracted from hops during a conventional brewing process include certain compounds referred to in the art as "α-acids", having STRUCTURE I, and "β-acids", having STRUCTURE II (and wherein R represents various, simple hydrocarbon groups, especially including isopropyl, isobutyl and sec-butyl), in combination with numerous, non-acidic organic compounds including fats, waxes, uncharacterized resins and steam volatile essential oils (especially certain mono- and sesqui-terpenes and oxygenated derivatives thereof).

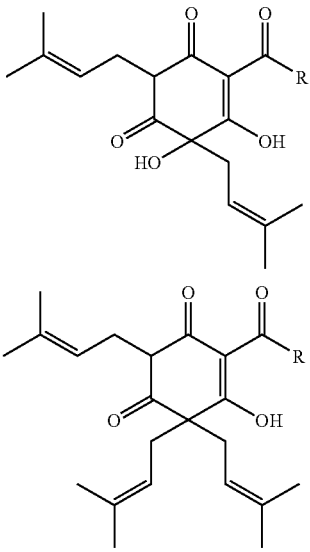

During the wort boil, α-acids isomerize to compounds referred to in the art as "iso-α-acids", having STRUCTURE III.

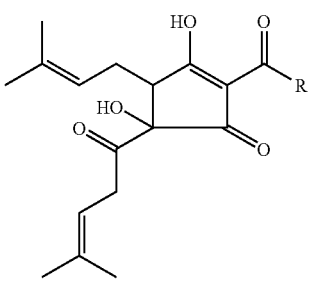

Unfortunately, as has long been recognized, malt beverages (i.e. beers including lagers, ales and stouts) brewed with normal hop products can develop "light-struck" flavors on exposure to light. These off-flavors are thought to be primarily caused by the photolytic action of near-UV wavelengths of light splitting off part of the isohexenoyl side chain of STRUCTURE III. The resulting dissociated, 1,1-dimethylallyl radical then reacts with naturally present compounds containing sulphydryl (—SH) groups to form a highly pungent mercaptan, 3-methyl-2-butene-1-thiol (MBT), which results in a sulphury aroma that is commonly described as "skunky" and generally considered to be unpleasant.

The prior art teaches processes wherein hop cones are extracted, and then that extract is fractionated to separate the α-acids, β-acids, and hop oils. For example, U.S. Pat. No. 5,917,093, incorporated herein by reference, teaches such a separation scheme. After separation, the isolated α-acids are isomerized to form the afore-described, light-unstable iso-α-acids which are known to impart the major portion of the traditional "bitter" taste to beer.

However, the prior art further teaches methods for the conversion of α-acids, iso-α-acids or β-acids to produce either tetrahydroiso-α-acids ("THIAA's"), having STRUCTURE IV, or hexahydroiso-α-acids ("HHIAA's"), having STRUCTURE V, which reportedly have much improved light stability.

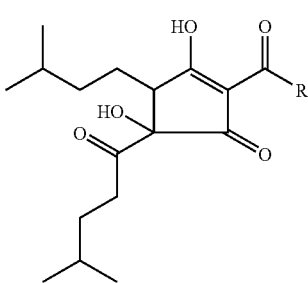

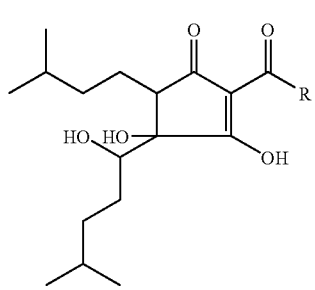

These reduced forms of iso-α-acids are resistant to the above-described photolytic action and hence beers brewed with these types of hydrogenated iso-α-acids materials do not develop MBT derived off-flavors. U.S. Pat. No. 5,013,571 teaches methods for making THIAA's and HHIAA's. The current commercial practice is for these compounds to be marketed as mildly alkaline, aqueous solutions of their potassium salts in the same way as is also done for iso-α-acids. Their solubility is rather more limited, though. Hence, for example, THIAA's are normally sold at a strength of 10% w/w, while iso-α-acids are commonly offered as stable solutions at a strength of 30% w/w. Furthermore, because these compounds are substantially less soluble than are iso-α-acids, it is normal practice only to add them directly to fermented beer rather than to the unfermented wort (whether before, during or after the normal kettle boil) thereby avoiding an otherwise inevitable and substantial loss of bittering substances through precipitation. Clearly, this is an inconvenience since it is necessary to install and operate specialized dosing equipment in order to make the additions. Furthermore, it will be apparent that the subsequent beer will be lacking in the traditional "hoppy" notes deriving from the residual hop oils that would normally be present as a consequence of the addition of hops, hop pellets or hop extracts to the wort before the end of the boil.

The prior art also teaches that a light-stable beer can be produced from so-called rho-iso-α-acids (STRUCTURE VI), dihydrogenated derivatives that have been prepared by chemical reduction of iso-α-acids using sodium borohydride. U.S. Pat. No. 3,044,879 describes an early, commercially workable process to achieve this transformation.

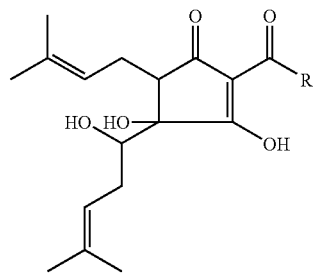

VI

Rho-iso-α-acids are more soluble than are THIAA's or HHIAA's and are usually sold commercially at a concentration of 35% (w/w) as measured by non-specific spectrophotometric ("Spectro") analysis (but are usually found to have a true strength typically in the range 23–30%, as determined by HPLC). However, such solutions often precipitate during storage, necessitating inconvenient heating to re-dissolve the precipitate before the product can be used as a post-fermentation additive.

Some brewers consider that the β-acids have no particular value in brewing. For example, U.S. Pat. No. 4,918,240 teaches, inter alia, "the hop β-acids have generally been considered a useless constituent of the hops." (Col. 2/1. 42–43). The '240 Patent teaches a method for the removal of catalyst poisons useful in the conversion of the "useless" β-acids into desired THIAA's. Other brewers, however, consider that the total removal of the β-acids and essential oils from the wort in the normal brewing process is detrimental to achieving the desired flavor. Thus, for these brewers the production of a beer having improved light-stability and a flavor that is comparable with that of a conventionally brewed beer is only possible if the β-acids and hop oils are present in the wort kettle.

See also U.S. Pat. Nos. 3,798,332, 4,324,810 and 5,583,262 and European Patent Application 94301014.0.

BRIEF DESCRIPTION OF THE INVENTION

In accordance with one aspect of the present invention, there is provided a novel composition (hereinafter referred to as "Beta Aroma Rho" or, more simply, as "BARho") formed from rho-iso-α-acids having Structure VI, wherein R is selected from the group consisting of isopropyl, isobutyl, sec-butyl, and mixtures thereof, in combination with hop β-acids and hop oils. Using this flavoring composition, beers that are rather resistant to development of light-struck flavors can be produced from a kettle product that is otherwise similar in appearance and composition to a normal kettle extract. Significantly, BARho does not contain α-acids, iso-α-acids, THIAA's, HHIAA's, or residual organic solvent molecules deriving from the extraction of hop cones or pellets. Nevertheless, in other respects, BARho contains all the ingredients traditionally favored in a kettle extract of hops.

In a separate embodiment, there is provided a high concentration, room temperature stable, partially aqueous composition of an alkali metal salt of reduced or rho-iso-α-acids, and a novel process to form same. Such a composition of rho-iso-α-acids may be used directly in a brewing process, or may be used as an ingredient in the formation of the above-described BARho derivative of hop extract.

The present invention offers brewers a process to make a light-stable beer in the easiest possible way, essentially by replacing normal kettle hopping with BARho, whilst at the same time allowing great flexibility to modify the hoppy character without the usual prejudice to the utilization rate.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
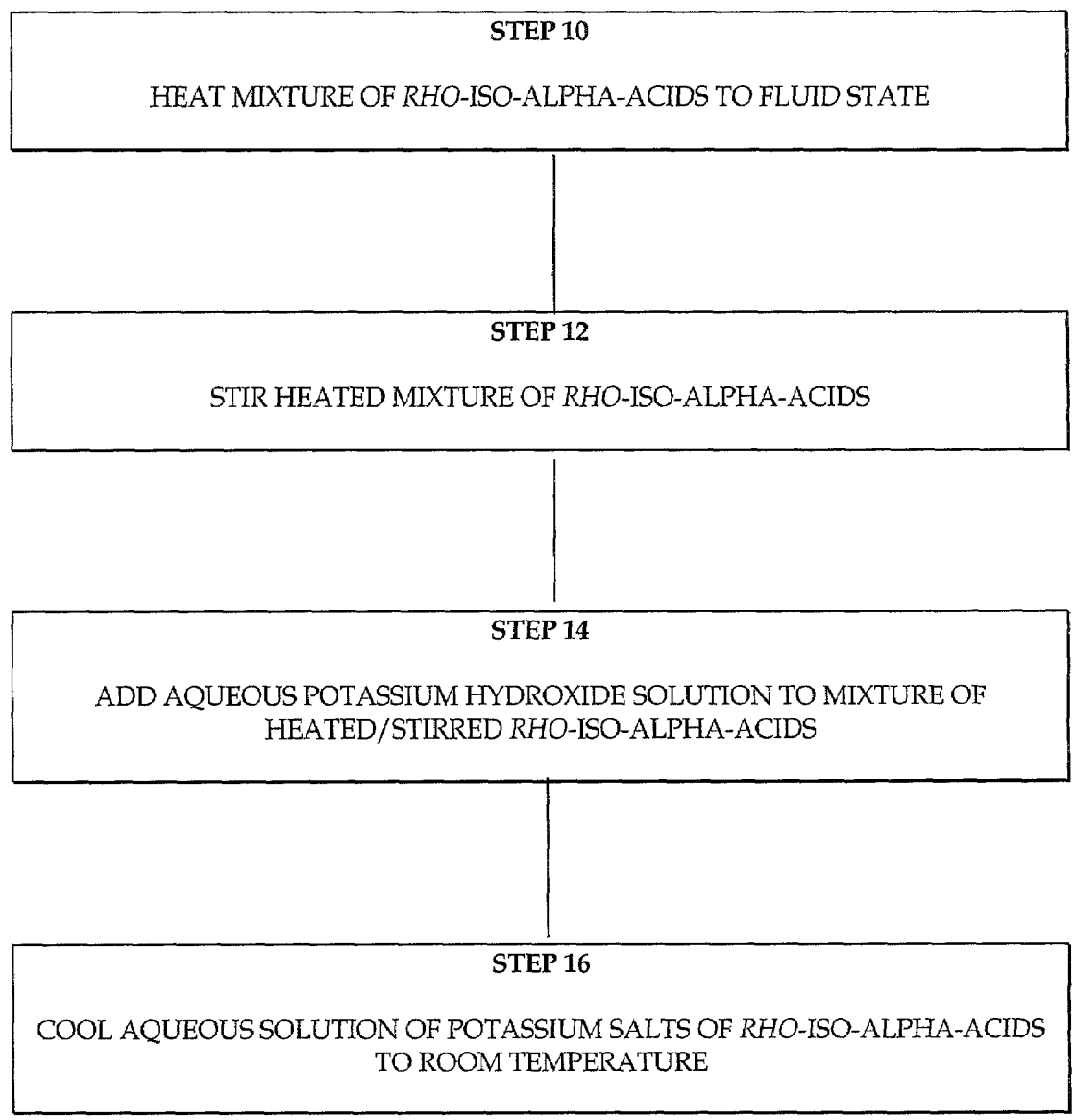
FIG. 1 is a flow chart illustrating a method to prepare a high solids content, room temperature stable, aqueous mixture of potassium salts of rho-iso-α-acids in accordance with one aspect of the present invention.

Preparation of High Solids Content, Partially Aqueous Composition of rho-iso-α-Acids FIG. 1 is a flowchart illustrating a process for forming a high solids content, room temperature stable, partially aqueous composition of rho-iso-α-acids in accordance with one embodiment of the invention. In step 10, a mixture of rho-iso-α-acids in their acidic, resinous form is heated to a fluid state. A fluid state means the mixture of rho-iso-α-acids has a bulk viscosity of no more than about 500 centipoises, preferably below about 100 centipoises. To achieve such a fluid state, the mixture of rho-iso-α-acids typically is heated to at least about 40° C., preferably to a temperature between about 50° C. and about 70° C., and most preferably to a temperature of between about 55° C. and about 65° C.

In step 12, the heated mixture is vigorously stirred or agitated. Stirring preferably is performed using a mechanical agitator turning a multi-blade mixing apparatus under an inert atmosphere, e.g. nitrogen. Alternatively, the heated mixture can be agitated, under an inert atmosphere, by an ultrasonic vibrator or the like.

In step 14, an aqueous alkali hydroxide solution is added to the heated and stirred mixture of rho-iso-α-acids to neutralize the acids and form a single phase, concentrated aqueous solution. Preferably, the alkali hydroxide solution is added as a saturated or near-saturated solution. The preferred alkali hydroxide is potassium hydroxide, which is added as a 45% solution, by weight. However, hydroxides of other Group IA alkali metals, including, for example, sodium hydroxide, advantageously also may be employed in accordance with the present invention.

The alkali hydroxide solution is added to the vigorously stirred or otherwise agitated and heated mixture of rho-iso-α-acids in a stepwise fashion while monitoring the resulting pH. Preferably, the alkali hydroxide solution is added at a rate of between about 0.01 equivalents per minute and about 0.2 equivalents per minute, more preferably between about 0.02 equivalents per minute and about 0.1 equivalents per minute, and most preferably between about 0.04 equivalents per minute and about 0.1 equivalents per minute. The aqueous alkali hydroxide solution is added to the heated and stirred mixture of rho-iso-α-acids until the pH of the resulting aqueous mixture has been raised to at least about 5, preferably until the pH of the aqueous mixture is between about 6 and about 11 and most preferably until the pH is about 9. Since it is hardly practical to measure pH value directly in a highly concentrated, viscous solution, by pH we mean the pH of the aqueous solution formed when the aforementioned mixture is diluted into demineralized water to form a solution (or at low pH values, a suspension) containing at least about 2% and not more than about 35% of rho-iso-α-acids as measured by HPLC.

Using a saturated or near-saturated alkali hydroxide solution to neutralize the acids results in a highly concentrated solution of rho-iso-α-acids. Once the target pH is reached, the aqueous solution will contain a solution mixture of the alkali salts of rho-iso-α-acids having a concentration of rho-iso-α-acids of between about 55 weight % and about 85 weight % by HPLC according to the alkali used and the purity of the rho-iso-α-acids resin from which the preparation is made.

In step 16, the stirring or agitation is optionally reduced or even discontinued and the mixture of alkali salts of rho-iso-α-acids is cooled to room temperature at a cooling rate of between about 1° C. per minute and about 10° C. per minute, preferably between about 3° C. per minute and about 10° C. per minute, and most preferably between about 5° C. per minute and about 10° C. per minute. Despite the high concentration of the rho-iso-α-acids, the alkali salts unexpectedly remain in solution. That is to say, the resulting high solids content, partially aqueous, viscous mixture of alkali salts of rho-iso-α-acids is at least temporarily stable at room temperature. By room temperature stability we mean that the aqueous mixture remains as a single phase and precipitates are not immediately formed. Indeed, we find that such highly concentrated solutions are no more liable to form precipitates as are the conventional solutions at about 35% (w/w) by spectrophotometric measurement or lower concentrations down to about 15% (w/w, Spectro).

The tendency of aqueous solutions of the alkali metal salts of rho-iso-α-acids to precipitate out of solution at much lower concentrations is a well-known phenomenon. In fact, the commercial practice is to offer rho-iso-α-acids at a concentration of at most about 35% (w/w, Spectro). This tendency to form precipitates makes the use of such a preparation as a post-fermentation additive more complicated, because it is then necessary to re-dissolve the precipitate by heating before it can be added to the beer. For this reason alone, some brewers will prefer to add the commercial product into the wort kettle to avoid this problem, accepting that the utilization of the rho-iso-α-acids will necessarily be reduced. In view of the apparent limit to the attainable solubility of the rho-iso-α-acids, it is therefore surprising to find it possible to prepare highly concentrated, albeit highly viscous, homogeneous solutions of the alkali salts of rho-iso-α-acids having rho-iso-α-acids concentrations of at least about 55% w/w, HPLC, (at least about 64% by Spectro). The reason for this is not known. However, the ability to prepare, package, store and ship rho-iso-α-acids in a semi-fluid state at about twice or even up to three times the normal concentrations results in significant saving of packaging, storage and transportation costs. It is particularly convenient to package this product in lacquer-lined tins that can be punctured and placed into the wort kettle in the same fashion as is commonly done by brewers using normal hop extracts.

Unlike the acidic resin from which it is prepared, the concentrated alkali salt of rho-iso-α-acid disperses and is dissolved readily into hot or boiling wort. It also is chemically much more stable. Thus, the concentrated alkali salts of the present invention form a stable product that may be added directly to the kettle, or else dissolved into demineralized water to form a solution that can be added post-fermentation or even added to beer without prior dilution provided that the product is heated sufficiently to re-form a suitably mobile, homogeneous fluid capable of injection into a beer main in the conventional manner. Alternatively, as described below, rho-iso-α-acids may be employed as a useful flavoring composition in preparation of a malt beverage by combining the highly concentrated, alkali metal salts rho-iso-α-acids composition with added β-acids and hop oils.

Preparation of BARho

Figure 2:
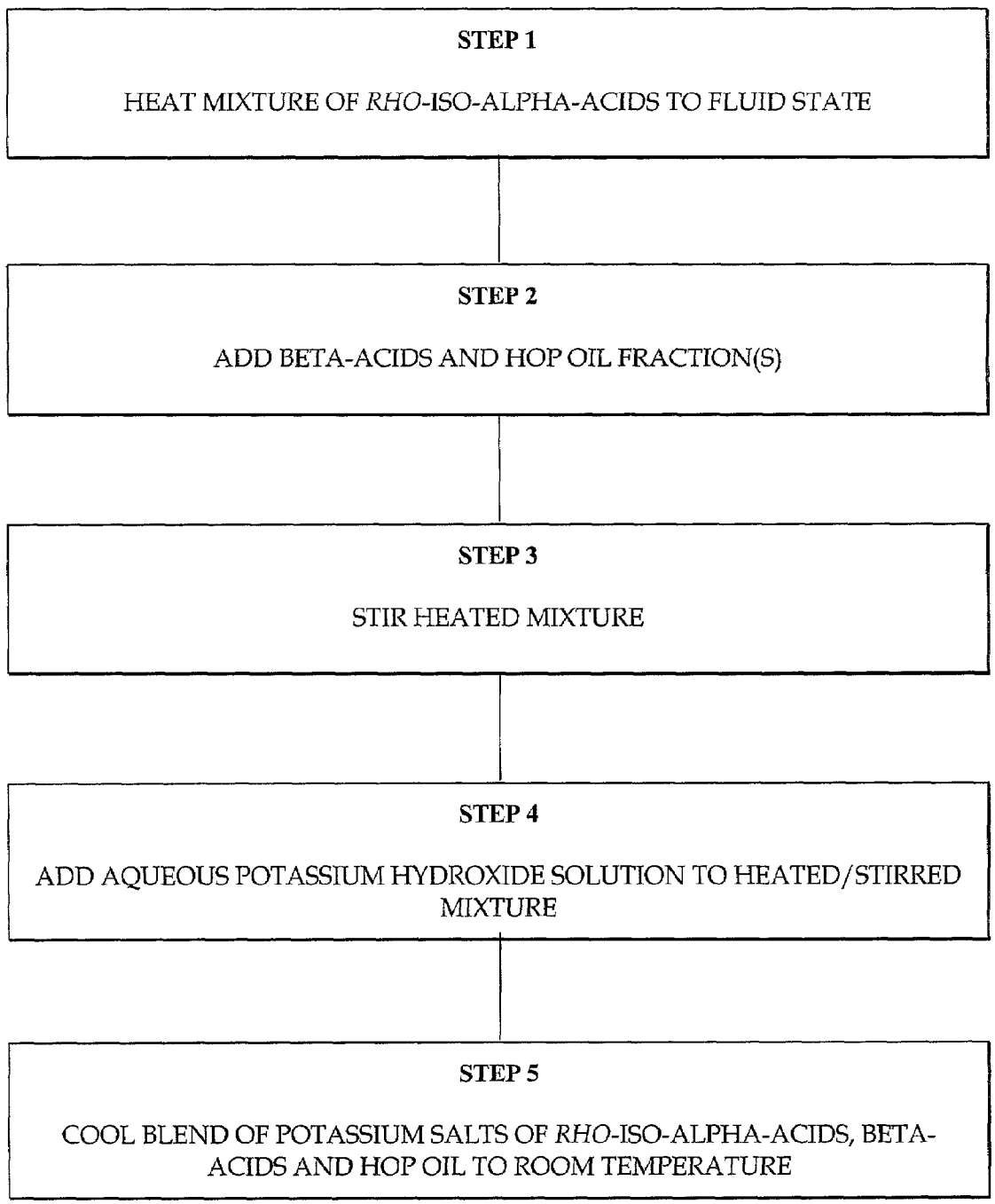
FIG. 2 is a flow chart illustrating the preparation of a modified kettle extract that can be used as a replacement for a normal liquid or supercritical $CO_2$ hop extract for the purpose of brewing a relatively light-stable beer that shares most of the characteristics of normally brewed beer, in accordance with a second embodiment of the invention.

In order to prepare BARho, it is first necessary to prepare a hop extract, preferably by extraction with liquid or supercritical $CO_2$. The α-acids of this extract are then converted to rho-iso-α-acids; for example, by a sequential process of isomerization of the α-acids, separation of the iso-α-acids from the β-acids and hop oils, followed by reduction of the iso-α-acids using the borohydride of an alkali metal, preferably sodium borohydride. Conversion of the so formed rho-iso-α-acids to a highly concentrated, partially aqueous solution by addition of concentrated alkali metal hydroxide solution is then achieved as previously described. Finally, a BARho product suitable for addition to the wort kettle is prepared by blending back the separated β-acids and hop oils (which may have been collected as one or more fractions and should not contain above trace amounts of (unreduced) iso-α-acids) with the aforementioned concentrate of the alkali metal salts of the rho-iso-α-acids. Alternatively, it is possible to first blend the acidic form of the rho-iso-α-acids with the p-acid and hop oil containing fraction or fractions, following which the desired product may be prepared by the controlled addition of a concentrated, aqueous solution of an alkali metal hydroxide sufficient to convert most or all of the rho-iso-α-acids into their alkali metal salts form as shown in FIG. 2. In the case where the hops are extracted by an organic solvent extraction using, for example, hexane, methylene chloride, trichloroethylene, methanol or ethanol, it may be necessary to add back hop oils, which oils may be obtained from either ethanol or $CO_2$ extraction of another lot of hops using one of the several ethanol extraction or $CO_2$ extraction techniques known in the art. For example, in the case of ethanol extraction of hops, the ethanol extract contains hop oil that can be separated from the hop resins by steam stripping the ethanol extract under vacuum, and the hop oil fraction recovered by centrifuging, or else by distillation in a known manner. Alternatively, the hop oil may be obtained by $CO_2$ extraction by, for example, using counter-flow $CO_2$ circulation followed by separation and recovery of the high hop oil proportion containing $CO_2$ extract, all in known manner. Still other methods of separating hop oil from hops are disclosed, for example, in U.S. Pat. No. 4,282,259 and in EPO published Patent Appln. No. 94301014.0 which disclosures are incorporated herein by reference.

In accordance with this second embodiment of the invention, a hop flavoring composition is prepared from reduced iso-α-acids (rho-iso-α-acids) that typically comprises between about 20% (w/w) and about 50%, preferably between about 30% and about 45%, and most preferably between about 35% and about 40% of rho-iso-α-acids plus β-acids in an amount between about 5% (w/w) and about 30%, preferably between about 10% and about 25%, and most preferably between about 15% and about 20% and hop oil in an amount between about 1% (v/v) and about 15%, preferably between about 3% and about 10%, and most preferably between about 5% and about 8%.

The present invention may be better understood by reference to the following examples which describe particular processes for the formation of the products described above and their use in the brewing of beer.

EXAMPLES

Example 1

Preparation of High Solids Content, Aqueous Composition of rho-iso-α-acids 156.0 g of a preparation of free-acid form, reduced (rho-) iso-α-acids resin (having a measured content of rho-iso-α-acids of 83.4% by HPLC, 100.2% by spectrophotometric analysis) was weighed into a glass beaker. To this viscous resin was next added 16 ml of deionized water. These ingredients were warmed to 52° C. and then vigorously stirred (640 RPM) using a propeller type stirrer. 36 ml of 45% (w/w) KOH was then added over a period of 11 minutes. The temperature rose to a maximum of 68° C. Stirring was continued for a further 19 minutes. All of the resin acids dissolved, forming a dark red, viscous but clear solution that remained homogeneous after cooling to ambient temperature. A sample was taken and the concentration of rho-iso-α-acids was determined to be 74.5% by spectrophotometric analysis and 62.7% by HPLC. This sample was further diluted to a concentration of about 35% (w/w by Spectro) and the pH determined to be 9.6. A further 30 ml of deionized water was then added to standardize the product at twice the usual concentration (and in so doing usefully reduce the viscosity). A convenient, standardized solution containing 70% (w/w by Spectro) of rho-iso-α-acids was subsequently prepared by blending 199.0 g of the concentrated solution with 12.8 ml of deionized water. Such a preparation is suitable for use as a kettle extract but also may be used directly as a post-fermentation additive if first heated to, for example, 50° C. to reduce its viscosity or else further diluted with deionized water to form a weaker solution that is more readily dispensed at ambient or cellar temperature.

Example 2

Preparation of BARho

BARho was produced by blending together the following ingredients (pre-heated to c. 40° C.) that had been previously manufactured from a supercritical $CO_2$ extract of Zeus hops: (a) rho-iso-α-acids resin (6.04 kg), (containing 78.0% rho-iso-α-acids and 1.0% β-acids by HPLC) and (b) β-acids/hop oil fraction (3.81 kg), (containing 49.5% β-acids, 18.6% (v/w) hop oils, 0.07% α-acids and 0.04% iso-α-acids). Additionally, (c), a small amount (0.19 kg) of a β-acids/hop oil fraction prepared from a supercritical $CO_2$ extract of Nugget hops was added to the above mixture, which was then vigorously stirred in a stainless steel, conical bottomed and thermostatically water jacketed mixing vessel using a propeller type stirrer. Into this mixture (at 38° C.) was then gradually transferred (using a peristaltic pump) a total of 1000 ml of 45% (w/w) KOH solution. This procedure took 38 minutes. The temperature of the mixture rose to a maximum of 58° C. A sample was taken and the pH determined by dispersing 10 drops of the resinous mixture into about 10 ml of hot, demineralized water. The measured pH value was between 6.2 and 6.3. Over the next hour, further KOH solution was then added (gradually, by pumping in 50 ml aliquots), the pH being checked after each aliquot of KOH had been dispersed into the mixture. After a total of 1250 ml of KOH had been added (i.e. after the addition of five, 50 ml portions of alkali hydroxide solution) the pH was noted to have risen to a value of 6.5. After stirring for another 50 minutes, the BARho product was then dispensed into 4 kg HDPE plastic pails and allowed to cool to room temperature. Two further samples were subsequently also packed into 2×250 g screw top air-tight HDPE containers as were 2×250 g of the original Zeus $CO_2$ extract. These extracts were stored in a refrigerator until used in the brewing trials described below. From a sample of the product, the content of hop resin acids was determined by HPLC, while the composition of the essential oils fraction was obtained by GC analysis (TABLE I).

TABLE I

| Parameter | $CO_2$ Extract | BARho |
|---|---|---|
| Alpha % | 57.6 | 0.0 |
| Pre-Iso Compounds (%)** | Trace (<1%) | 3.9 |
| Rho-Iso-alpha (%) | 0.0 | 40.4 |
| Beta (%) | 19.1 | 17.6 |
| Moisture (%) | N.D. (Typically <1%) | 13.5 |
| Cohumulone Ratio | 0.28 | 0.26 |
| Total Oil (mls./100 g) | 8.1 | 6.6 |
| Myrcene (%) | 41.6 | 18.7 |
| Caryophyllene (%) | 10.7 | 13.3 |
| Farnesene % | 0.2? | 0.2? |
| Humulene (%) | 17.0 | 21.9 |
| Linalool (%) | 0.60 | 0.65 |
| "Epoxides" Fraction* (%) | 1.3 | 6.3 |
| Humulene-2-ol (%) | Trace (c. 0.05%) | c. 0.2?† |

*Defined as components eluting between 44.0 and 50.0 mm on the CC trace.
**Measured as if having the extinction coefficient of iso-α-acids.
N.D. = Not Determined
†Peak not integrated.

The analysis for BARho shown in Table I recites an analysis for one embodiment of our BARho composition, that embodiment comprising about 40.4% rho-iso-α-acids, about 17.6% β-acids, and about 6.6% hop oils.

Both the above extracts were fairly viscous at room temperature. Pre-heating of such extracts prior to use is desirable if such materials are to be poured or dosed using an automated addition system. However, as both extracts were physically similar, handling characteristics for BARho products can be considered as essentially no different from the extracts from which they are made, and consequently methods of addition can be the same as are used for normal kettle extracts.

Example 3

Brewing Tests

To evaluate the aforesaid BARho as a flavoring component of beer, four brews were carried out on the pilot brewing scale. Two of the four brews were flavored with BARho (as prepared in Example 2) and the other two brews were formed using the aforementioned supercritical carbon dioxide hop extract ("$CO_2X$") produced from Zeus hops. Beer from each brew was packaged into glass bottles within the pilot brewery. The target specification for the (mostly) non-hop-related parameters in the finished beers was as follows:

| | |
|---|---|
| Alcohol: | 4% abv |
| OG: | 9.75° P |
| PG: | 2.0° P |
| Color: | 5 EBC units |
| Haze: | <1.0 EBC unit |
| pH: | 3.9 |
| $CO_2$: | 2.5 vols. |
| $DO_2$: | <0.3 ppm |

Four, 2 hectoliter brews were carried out on consecutive days, as follows:

Brew 1: BARho - single addition ("Early")
Brew 2: BARho - two additions ("Late")
Brew 3: $CO_2X$ - single addition ("Early")
Brew 4: $CO_2X$ - two additions ("Late")

The brewing plant was double cleaned prior to the start of the trials in order to eliminate the risk of any residual hop material contaminating the trial brews. The BARho beers were brewed first to avoid possible contamination with iso-α-acids from the $CO_2$ extract brews.

In the first brew of each pair (i.e. the "Early" brews), all of the particular extract was added at the start of the 60 min. boil, whereas in the second, ("Late") brews, the extracts were added in two parts—at the start of the boil (early addition) and after about 50 minutes (late addition). The $CO_2X$ in the control, late addition Brew 4 was split 66:34 by weight of α-acids. In the corresponding BARho brew 2 the late addition was split 70:30 by weight of rho-iso-α-acids. This particular split was a compromise, determined in an attempt to roughly equalize the late addition of aroma components from the BARho with that of the $CO_2X$. The hop oil content of the BARho was less than that of the $CO_2X$ (6.6% v 8.1%), but it was considered that its lower proportion of myrcene (18.7% v 41.6%) more than restored the balance in respect of the non-myrcene components (total content in the extracts of 5.4% v 4.7%). However, since the actual compositions of these non-myrcene fractions were not identical, it was impossible to ensure that the additions of all potentially flavor-active substances were exactly matched.

The timing and quantities of extract added for each brew are shown in TABLE II.

TABLE II

| Addition Parameters | Brew 1 BARho, "Early" | Brew 2 BARho, "Late" | | Brew 3 $CO_2X$, "Early" | Brew 4 $CO_2X$, "Late" | |
|---|---|---|---|---|---|---|
| Time of Addition (Min) | 0 | 0 | 50 | 0 | 0 | 50 |
| Wt. Added (g/hL) | 15.74 | 10.87 | 4.48 | 12.26 | 10.25 | 5.37 |

The full brewing specification is shown in TABLE III.

TABLE III

| Brewing Specification | | |
|---|---|---|
| 1. Grist: | 99.5% lager malt | |
| | 0.5% crystal malt | |
| 2. Mashing: | Liquor/grist ratio | 3:1 |
| | Mash schedule: | 65° C. for 60 mins. |
| | | Rise to 76° C. |
| | | Hold at 76° C. for 1 minute |
| | | Transfer to lauter tub |
| 3. Lauter: | Rest for 5 minutes | |
| | Re-circulate until bright (c. 20 mins.) | |
| | Collect wort until run-off 4° | |
| | Sparge at 76° C. | |
| 4. Boiling Regime: | Calandria (104° C.) | |
| | 60 mins. boil | |
| | 10% evaporation | |
| | Addition of extract as defined | |
| | Hot break removal by whirlpool | |
| | Whirlpool stand 30 mins. | |
| 5. Fermentation: | Collect between 9–10° C. | |
| | DO (dissolved oxygen) to c. 8 ppm | |
| | Pitch yeast at 6 m cells per ml. | |
| | ("Alpha-free" yeast) | |
| | Allow temperature to rise to 12° C. then hold at 12° C. until PG reaches AL +5. | |
| | Cool to 4° C. over 24 hrs. | |
| 6. Conditioning: | Hold at 4° C. for 7 days | |
| | Rapid cool to −1.5° C. | |
| | Hold at −1.5° C. for 48 hrs. | |
| | $CO_2$ top pressure 25 psi - carbonation 2.5 vols. | |
| 7. Filtration: | Carlson filtration unit with Carlson XE400 filter sheets. | |
| 8. Bottling: | Bottle 7 doz. in new 33 cl brown bottles, 1 doz. in clear glass. | |

The additions of the hop extracts were calculated on the combined basis of two, key factors; namely: (i) anticipated Utilization Rate (for "Early" and "Late" kettle additions), and (ii) relative Perceived (i.e. tasted) Bitterness for the iso-α-acids and rho-iso-α-acids; the intention, of course, being to achieve the same perceived bitterness in all the brews. The effect of these factors on the addition rates is shown in TABLE IV.

TABLE IV

| | "Early" Brews | | "Late" Brews | |
|---|---|---|---|---|
| Parameter | $CO_2X$ | BARho | $CO_2X$ | BARho |
| Assumed Overall Utilization (%) | 34 | 55 | 27.5 | 56.5 |
| Perceived Bitterness Factor | 1.00 | 0.70 | 1.00 | 0.70 |
| Calculated α/Rho-Iso-α Addition Rate (ppm) | 70.6 | 63.6 | 87.3 | 62.0 |
| Anticipated Iso-α/Rho-iso-α Content in Beer (ppm) | 24.0 | 35.0 | 24.0 | 35.0 |
| Anticipated $BU_{50}$ Value in Beer* | 24 | 31.5 | 25 | 1.5 |

*Takes account of different extinction coefficients between iso-α-acids and rho-iso-α-acids Each extract was thoroughly mixed some days before the start of the brewing trials and the calculated amounts for each brew accurately weighed into an HDPE, screw-top container that was then stored in the refrigerator. Prior to use, the extracts were allowed to warm back to room temperature. Then, at the appropriate time, hot wort from the kettle was thoroughly blended into the extract and the mixture tipped into the kettle via the addition point. To ensure that the full amount of extract was added, the container was finally washed out twice with hot wort and the washings added back into the kettle, with no visible residue remaining in the container.

Following fermentation, the brews were sterile filtered (single pass) into 2×50 liter kegs. Each brew was then bottled, using a hand operated, single head filler into 285 ml clear glass bottles (12 bottles of each) and 330 ml brown glass bottles (84 bottles of each) for analysis and tasting. All the bottles of each type were placed into cold storage until required for testing.

The beer analyses are shown in TABLE V. In terms of the key physical quality parameters—haze and foam—no consistent, significant differences were detected in either of the two sets of the brews. Formal gushing tests were not carried out on any of the beers. However no signs of gushing were observed upon opening bottles of fresh brew from any of the four brews during tasting.

TABLE V

| Hopping Regime | Extract Type & Brew No. | PG | ABV | pH | Color °EBC | Haze EBC | Diacetyl ppm | Foam (sec) | | $CO_2$ vol | DO ppb |
|---|---|---|---|---|---|---|---|---|---|---|---|
| | | | | | | | | Rudin | NIBEM | | |
| "Early" | $CO_2$X (3) | 5.8 | 4.4 | 4.26 | 5.5 | 0.8 | 0.07 | 81 | 224 | 2.55 | 88 |
| (0 min) | BARho (1) | 5.8 | 4.3 | 4.30 | 5.5 | 0.8 | 0.06 | 85 | 228 | 2.61 | 93 |
| "Late" | $CO_2$X (4) | 6.1 | 4.3 | 4.32 | 5.5 | 0.9 | 0.07 | 78 | 230 | 2.60 | 90 |
| (0 & 50 min) | BARho (2) | 6.1 | 4.3 | 4.25 | 5.5 | 0.8 | 0.07 | 82 | 242 | 2.56 | 85 |

The utilization of α-acids or rho-iso-α-acids from the extracts into the finished beers was calculated using two different procedures. TABLE VI shows the utilization results by BU analysis.

TABLE VI

| Hopping Regime | Extract Type & Brew No. | Wort $BU_{50}$ | Utilization in Wort % | Final Beer $BU_{50}$ | Utilization in Beer % | Increase in Utilization ref: $CO_2$X |
|---|---|---|---|---|---|---|
| "Early" | $CO_2$X (3) | 42.5 | 59.1 | 26.5 | 36.8 | N/A |
| (0 min) | BARho (1) | 44.1 | 67.7 | 36.4 | 55.8 | 1.52 × |
| "Late" | $CO_2$X (4) | 50.8 | 57.3 | 27.1 | 30.6 | N/A |
| (0/50 min) | BARho (2) | 42.3 | 67.1 | 35.9 | 56.9 | 1.85 × |

In the above BU analyses (conducted according to the method of the Institute of Brewing), the absorbance of the isooctane solution, measured at 275 nm, was multiplied by the standard factor of 50. Organoleptic comparisons suggest that, when pre-isomerized kettle products (c.f. Isomerized Hop Pellets) are used, this factor should be increased to 55–58. Also, for the rho-iso-α-acids a further factor (1.11×) needs to be applied to take account of a lower extinction coefficient relative to iso-α-acids. If these factor increases are applied then the utilizations shown above are more in line with the actual utilization values as determined by HPLC analysis and shown in TABLE VII, which table also shows the actual mg/liter (=ppm) iso-α-acids, rho-iso-α-acids and residual α-acids by HPLC.

TABLE VII

| Hopping Regime | Extract Type & Brew No. | Iso-α- Acids (ppm) | Rho-iso- α- Acids (ppm) | Residual α- Acids (ppm) | Utilization in Beer (%) | Increase in Utilization |
|---|---|---|---|---|---|---|
| "Early" | $CO_2$X (3) | 28.0 | 0.0 | 3.5 | 38.9 | N/A |
| (0 min) | BARho (1) | 1.2 | 47.8 | 0.0 | 75.2 | 1.93 × |
| "Late" | $CO_2$X (4) | 30.2 | 0.0 | 4.1 | 34.0 | N/A |
| (0/50 min) | BARho (2) | 0.8 | 46.7 | 0.0 | 75.3 | 2.21 × |

The HPLC analyses more accurately reflect the true situation in respect of perceived bitterness, since the HPLC analysis is specific for iso-α-acids and rho-iso-α-acids whereas the absorbance, measured in the BU method, includes significant amounts of non-bitter and even non-hop material (though, of course, it must be remembered that rho-iso-α-acids are less bitter than are iso-α-acids—see Table IV).

The utilizations of the BARho brews were calculated by taking only the rho-iso-α-acids results into account. In both sets of results, the BARho brews clearly show very substantial increases in utilization compared to the $CO_2X$ controls. This effect is even more startlingly apparent for the additions made late in the boil. Assuming that the utilizations achieved at the start of the boil are consistent in all brews, then the approximate utilizations actually achieved by the late additions alone can be calculated. In TABLE VIII these figures are shown and compared with the original assumptions in the formulation of the hop extract additions. Under the conditions of the pilot brewhouse, the actual utilizations of both early and late additions were consistently higher than the original assumptions.

TABLE VIII

| Hopping Regime | Extract Type & Brew No. | Early - % Assumed | Early - % Actual | Late - % Assumed | Late - % Actual |
|---|---|---|---|---|---|
| "Early" (0 min) | $CO_2X$ (10) | 34.0 | 38.9 | N/A | N/A |
|  | BARho (8) | 55.0 | 75.2 | N/A | N/A |
| "Late" (0/50 min) | $CO_2X$ (11) | 34.0 | 38.9* | 15.0 | 24.8† |
|  | BARho (9) | 55.0 | 75.2* | 60.0 | 75.4† |

*Presumed
†Calculated

The content of volatile oils in each of the beers was calculated following GC analyses of the extracts and the resultant beers, the results being shown in TABLE IX. The measured volatile oil contents were, as expected, higher for the late hopped brews.

TABLE IX

| Hopping Regime | Extract Type & Brew No. | Total Oil Added (gms) | Total Oil in Beer (µg/l) | Total Oil in Brew (gms) | % Oil Recovery |
|---|---|---|---|---|---|
| Early (0 min) | $CO_2X$ (10) | 1.98 | 19.2 | 0.004 | 0.20 |
|  | BARho (8) | 2.08 | 30.6 | 0.006 | 0.29 |
| Late (0 & 50 min) | $CO_2X$ (11) | 2.53 | 38.1 | 0.008 | 0.32 |
|  | BARho (9) | 2.03 | 48.9 | 0.010 | 0.49 |

Chromatographic analysis of the oil fractions recovered from the beers showed that they each contained about 20 (mostly unknown) compounds that are believed to be associated with hops. TABLE X lists these in order of elution from the gas chromatograph (values are concentration in ppb).

TABLE X

| | Elution | | Early Hopping | | Late Hopping | |
|---|---|---|---|---|---|---|
| Peak No. | Time (min) | Compound | $CO_2X$ (10) | BARho (8) | $CO_2X$ (11) | BARho (9) |
| 1 | 21.5 |  | 1.3 | 5.4 | 3.7 | 5.5 |
| 2 | 24.7 |  | 0.4 | 7.0 | 0.5 | 8.7 |
| 3 | 31.9 | Linalool | 1.9 | 1.9 | 12.0 | 10.2 |
| 4 | 33.9 |  | 0.5 | 0.2 | 0.4 | 0.2 |
| 5 | 34.7 |  | 0.3 | 0.4 | 0.5 | 0.6 |
| 6 | 35.2 |  | — | — | — | — |
| 7 | 35.9 |  | 1.3 | 1.7 | 1.9 | 1.7 |
| 8 | 37.2 |  | 0.2 | 0.4 | 0.2 | 0.2 |
| 9 | 38.3 |  | 0.8 | 1.3 | 1.8 | 2.5 |
| 10 | 43.0 |  | 1.4 | — | 1.3 | — |
| 11 | 43.2 |  | 3.0 | 4.7 | 6.0 | 7.6 |
| 12 | 45.9 |  | 1.4 | — | 1.1 | — |
| 13 | 47.1 |  | 1.0 | 0.5 | 0.9 | 0.7 |
| 14 | 47.4 |  | 0.3 | 0.5 | 0.4 | 0.4 |
| 15 | 47.6 |  | — | 0.1 | — | — |
| 16 | 48.8 |  | 0.5 | — | 0.5 | — |

TABLE X-continued

| | Elution | | Early Hopping | | Late Hopping | |
|---|---|---|---|---|---|---|
| Peak No. | Time (min) | Compound | CO$_2$X (10) | BARho (8) | CO$_2$X (11) | BARho (9) |
| 17 | 49.0 | | 0.5 | 0.6 | 0.6 | 1.7 |
| 18 | 53.7 | | 0.8 | 0.9 | 1.5 | 2.1 |
| 19 | 54.1 | | 0.6 | 1.0 | 0.5 | 0.9 |
| 20 | 54.4 | | 0.3 | 0.5 | 0.9 | 1.0 |
| 21 | 55.4 | Humulene-2-ol | 0.9 | 2.0 | 0.9 | 2.9 |
| 22 | 55.5 | | 1.6 | 0.4 | 1.8 | 0.6 |
| 23 | 55.8 | | 0.2 | 1.1 | 0.7 | 1.4 |
| | | Totals: | 19.2 | 30.6 | 38.1 | 48.9 |

Like for like, the BARho beers had more hop-derived total oil than did the CO$_2$X controls, and the brews with late hopping more oil than the entirely early hopped ones. Examination of the GC charts of the oil fractions of the two extracts showed that the balance of compounds in the BARho oil was biased such that it contained proportionally more of the less volatile—normally flavor-active and oxygenated—compounds than did the CO$_2$X oil. It is surmised that these differences were due to heat induced changes during the processing of the CO$_2$X. They are presumably due to simple evaporative loss of volatiles as well as to some chemical changes, both of which are reminiscent of the (often desirable) changes that occur naturally during aging of baled hops. However, when the beers were tasted it was apparent that, despite the analytical differences, there were no substantial flavor differences between any of the beers. The apparent lack of readily noticeable late hop character in these beers is believed merely to indicate that the proportional amount of the late additions of extracts was not large enough or delayed late enough for this character to be clearly manifested. Light stability tests on the bottled beers were also conducted. Duplicate, clear glass bottles were exposed to fluorescent light for 72 h in a special cool cabinet (held at 10° C). The brews were then analysed for the "skunky" sulphur compound, 3-methyl-2-butene-1-thiol (MBT), by headspace analysis of sulphur volatiles using a Sievers chemiluminescence detector. As controls, the beers from single, brown glass bottles were also analysed, these beers not having been given prior exposure to light. TABLE XI recites the results of these analyses.

TABLE XI

| Bottle Type & | 3-Methyl-2-Butene-1-Thiol (MBT) (ppt) | | | |
|---|---|---|---|---|
| Fluorescent | "Early" Brews | | "Late" Brews | |
| Light Exposure | CO$_2$X (3) | BARho (1) | CO$_2$X (4) | BARho (2) |
| Brown, Unexposed | N.D. | N.D. | Trace? (<10) | Trace? (<10) |
| Clear, 72 h Exposure | 1988, 1947 (Av. = 1968) | 44, 51 (Av. = 48) | 1510, 1962 (Av. = 1736) | 246, 110 (Av. = 178) |

N.D. = Not Detected

As shown in Table XI, MBT was produced in all the beers exposed to the fluorescent light, but the amounts were much greater in the CO$_2$X controls than in the BARho brews. These results clearly demonstrate that BARho is a relatively "light-stable" product.

The results of the brewing experiments can be summarized as follows:

a. The trial extract was very similar to the control extract in its physical consistency and use. It is therefore apparent that BARho could be handled in similar ways to CO$_2$ extract in the brewery;

b. Utilization of rho-iso-α-acids (as measured by HPLC) of 75% was achieved by using BARho kettle extract added at the start of the boil. This represents an increase in utilization compared to the control CO$_2$ extract of 93%;

c. For the portion of BARho used as a late addition (in Brew 2), a similar utilization (as measured by HPLC) of 75% was achieved. This represents an approximately 300% improvement in utilization compared to the corresponding portion of control CO$_2$ extract added at a similar time in the boil (Brew 4);

d. Significant improvements in oil recovery were achieved by the late addition of BARho;

e. BARho clearly imparted a considerable degree of light stability to the brews. Hence, for the purpose of brewing a beer for packaging into clear glass bottles, BARho represents a considerable improvement over standard kettle CO$_2$ extract without imparting any apparent, adverse flavor differences;

f. From the above data it is clear that significant reductions in material usage could be achieved by using BARho instead of normal CO$_2$ extract if a comparable, but relatively light-stable beer is required;

g. The simple addition of BARho to the kettle is an easy and flexible means to relatively light-stable and (as we believe), if desired, "hoppy" character beers through kettle hopping alone.

Various changes may be made without departing from the spirit and scope of the Invention. For example, while potassium hydroxide has been employed in the described processes of the Invention to neutralize the rho-iso-α-acids, other alkali metal hydroxides may be used. Also, while extraction of hops using supercritical CO$_2$ has been described as means for obtaining a suitable extract from which to prepare concentrated rho-iso-α-acids and BARho, other extraction processes, including liquid CO$_2$ extraction as well as organic solvent extraction processes, may be employed. Accordingly, it is to be understood that the present invention is not to be limited to the exact details of operation, or to the exact compounds, compositions, methods, procedures or embodiments shown and described above. Wherefore, the present invention is to be limited only by the full scope which can be legally accorded to the appended claims and in which claims the stated concentrations of reduced (rho-) iso-α-acids and β-acids are understood to be as defined by HPLC analysis.

What is claimed is:

1. A process for forming a stable, high solids content, partially aqueous composition containing reduced (rho-) iso-α-acids, comprising the steps, in sequence, of (A) heating a mixture of reduced (rho-) iso-α-acids in their acidic resinous form to fluid state, and (B) adding a concentrated aqueous alkali metal hydroxide solution to said heated mixture, with stirring, to form a concentrated, single phase aqueous solution containing a mixture of alkali metal salts of said reduced (rho-) iso-alpha-acids.

2. The process of claim 1, wherein said concentrated aqueous alkali hydroxide solution is added to said heated mixture of reduced (rho-) iso-α-acids stepwise until a substantially neutral or slightly alkaline pH is attained.

3. The process of claim 1, further comprising the step (C) of cooling said resulting, concentrated, single phase aqueous solution of alkali metal salts of reduced (rho-) iso-α-acids of step (B) to room temperature.

4. The process of claim 1, wherein said concentrated alkali metal hydroxide solution comprises potassium hydroxide.

5. The process of claim 4, wherein said potassium hydroxide comprises a saturated aqueous solution containing about 45 weight percent potassium hydroxide.

6. The process of claim 1, wherein said concentrated, single phase solution contains about 55 to about 85 weight percent of alkali metal salt of said reduced (rho-) iso-alpha acids.

* * * * *

UNITED STATES PATENT AND TRADEMARK OFFICE
CERTIFICATE OF CORRECTION

PATENT NO. : 7,087,256 B2
APPLICATION NO. : 09/896375
DATED : August 8, 2006
INVENTOR(S) : Gimbel et al.

It is certified that error appears in the above-identified patent and that said Letters Patent is hereby corrected as shown below:

Detailed Description of the Preferred Embodiments and Examples as follows:

Preparation of BARho, Col. 6, line 48, "the p-acid" should be -- the β-acid --.

Example 2, Table I, Col. 8, line 45, "Famesene" should be -- Farnesene --.

In Col. 8, line 50, "mm on the CC" should be -- min on the GC --.

Example 3, Table IV, Col. 10, line 53, Anticipated $BU_{50}$ Value in Beer – Late Brews BARho "1.5" should be -- 31.5 --.

Signed and Sealed this

Twenty-fourth Day of August, 2010

David J. Kappos
*Director of the United States Patent and Trademark Office*